Feb. 9, 1960 W. C. LAMPHIER ET AL 2,923,977
PROCESS FOR IMPROVING THE ELECTRICAL CHARACTERISTICS
OF POLYETHYLENE TEREPHTHALATE FILM
Filed Feb. 16, 1955

WALTER C. LAMPHIER
WILLIAM B. ROBINSON
ARTHUR J. CHRISTOPHER JR.
*INVENTORS*

BY *Connolly and Hutz*

THEIR ATTORNEYS

United States Patent Office

2,923,977
Patented Feb. 9, 1960

2,923,977
PROCESS FOR IMPROVING THE ELECTRICAL CHARACTERISTICS OF POLYETHYLENE TEREPHTHALATE FILM

Walter C. Lamphier, William B. Robinson, and Arthur J. Christopher, Jr., Williamstown, Mass., assignors to Sprague Electric Company, North Adams, Mass., a corporation of Massachusetts Application February 16, 1955, Serial No. 488,448

2 Claims. (Cl. 18—48)

This invention relates to a process for improving the electrical characteristics of polyethylene terephthalate film by solvent removal of low leakage resistance materials present in the surface of said film.

Polyethylene terephthalate is well recognized as a resinous material having exceptional electrical insulation characteristics. It has been the subject of much interest by manufacturers concerned with electrical insulation and has been extensively covered by such papers as the one by Wooley et al. entitled "Polyethylene Terephthalate as a Capacitor Dielectric" appearing in the August 1952 issue of Electrical Engineering, pages 715–717. It has been found that at elevated temperatures the presently known film does not exhibit sufficiently desirable insulation resistances. Moreover, the film as received from the manufacturer suffers from extreme variation in high temperature electrical characteristics.

It is an object of this invention to overcome the foregoing and related disadvantages of the presently known polyethylene terephthalate films. It is a further object of this invention to produce improved polyethylene terephthalate films having a much increased insulation resistance at temperatures in excess of 100° C. It is a still further object of this invention to produce such a film in a continuous manner so that it becomes feasible to use the improved film for large scale manufacturing of electrical devices that utilize such a film. Further objects will become apparent from the following description and appended claims when read in conjunction with the accompanying drawing, wherein:

The objects of this invention have been achieved by the preparation of a polyethylene terephthalate film whose surface is free from relatively low leakage resistance materials, particularly the trimer of ethylene terephthalate. The objects have been further achieved by the preparation of a polyethylene terephthalate film of less than 1 mil thickness exhibiting a three-fold increase in insulation resistance over the presently known polyethylene terephthalate films at a temperature of 125° C. These objects have for continuous treatment of the known polyethylene terephthalate film to remove the low leakage resistance surface material, thereby providing a thin film exhibiting improved insulation resistance at temperatures in excess of 100° C., dissipation factor and breakdown voltage.

We have discovered that extraction of the present available polyethylene terephthalate film by a suitable solvent results in a modified dielectric material having insulation resistance at 125° C. that is 300 to 400% improved over that of the original film. Apparently the extraction of the surface of polyethylene terephthalate results in the removal of a low resistance substance, the cyclic trimer of ethylene terephthalate, which is present in sufficient amounts to materially decrease the leakage resistance of the high molecular weight constituent of the film. This material does not fully exist as a unitary surface layer but appears to be bound within the surface of the film. After extraction, the polymer of ethylene terephthalate has an average molecular weight of between 1000 and 5000 or higher, and as such is of utility for electrical applications.

To identify the substance removed from within the surface of the resin by the solvent action, polyethylene terephthalate film of ¼ mil thickness was wound with a layer of kraft paper and extraction was carried out in a standard Soxhlet apparatus for a period of 88 hours at a temperature of 87.2° C. Removal of the solvent (trichloroethylene) from the extract yielded approximately 1% of a solid which, after several crystallizations from dimethyl formamide, melted at 325–327° C. This solid was found to be soluble in concentrated sulfuric acid, but insoluble in phosphoric acid, dilute acid, dilute alkali, water and pyridine. Further analysis showed an average molecular weight of 554 with an absence of halogen, nitrogen and sulfur. This extracted solid was thus established as the cyclic trimer of ethylene terephthalate.

Figure 1:
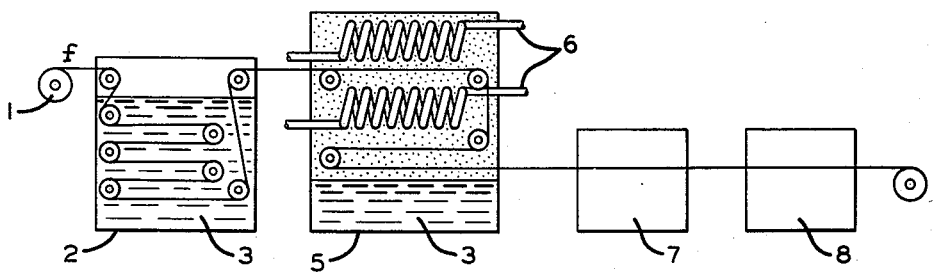
Fig. 1 is a diagrammatic showing of the process steps of this invention.

For better understanding and appreciation of our invention, examination should be made of Fig. 1 which shows a block diagram portraying continuous extraction of the surface low leakage resistance material from the polyethylene terephthalate film. The received film $f$ is drawn from a spool 1 into the solvent tank 2 containing the liquid solvent 3 which is maintained at an elevated temperature, substantially that of the boiling point of the solvents, so as to accelerate dissolution of the low molecular weight polymeric material from the surface. The film $f$ winds about a series of rollers disposed below the surface of the solvent 3 with its speed of travel and path such that the film $f$ remains immersed in the solvent 3 for a period in excess of 2 minutes and preferably for from 10 to 15 minutes. Exposure of the film $f$ to the solvent in excess of fifteen minutes is marginal in utility as the electrical characteristics are thereafter only slightly improved. Time of extraction to achieve the improved film is thus from about two minutes to about 15 minutes. Solvents for the low leakage resistance material include ethyl alcohol, benzene, and trichloroethylene with the latter preferred for commercial applications. The extraction temperature ranges from 70° C. to about 90° C.

After the film $f$ leaves the solvent tank 2 it passes into the wash chamber 5 which contains a solvent 3 maintained at boiling so that substantial vaporization occurs. In order to maintain appreciable dissolution rates it is necessary to distill the solvent at intervals to avoid saturation of the solvent with the solute. As an alternative to periodic complete change, a continual recharging of the tank 2 with the pure solvent could be utilized. The upper region of the wash chamber 5 has a cooling coil 6 which condenses the solvent vapors so as to provide a continuous stream of distilled solvent across both surfaces of the polyethylene terephthalate film $f$. This wash removes all trace of the dissolved low resistance material thus avoiding the possibility of the solvent volatilizing and leaving a residue, as was found to result in the absence of the wash.

The film $f$ passes from the wash chamber 5 into a drying oven 7 which is maintained at a temperature in excess of 150° C. and preferably at the upper end of the range of 150° C. to 200° C. After exposure in the drying oven 7 for a period of 1 to 2 minutes, the film passes into a vacuum drying chamber 8, which chamber is maintained at a pressure of from 2 to 10 microns. The film $f$ after passing through the vacuum drying chamber now exhibits the much improved high temperature electrical characteristics.

As indicated in the foregoing, the extraction of the trimer of ethylene terephthalate can alternatively be carried out by a batch extraction technique. In this process five-hundred to one-thousand feet of polyethylene terephthalate film is wound with a similar length of porous paper spacer, both materials of about 0.00025" thickness; thereafter placed in an extraction apparatus such as the standard Soxhlet; and, subjected to the vapors of the solvent for extraction periods of from forty to one-hundred hours. The solvents recited above are used at their respective boiling points so as to obtain satisfactory extraction of the trimer. A plurality of rolls (fifty or more) of the polyethylene film interleaved with paper can be simultaneously extracted in appropriately sized apparatus.

The following data is representative of that obtained in comparison of the extracted film with the film as received. The average breakdown voltage was raised substantially of the 0.25 mil thick film:

*Average breakdown voltages (0.25 mil thick Mylar)*

| Control, v. D.C. | Alcohol Extracted v. D.C. |
|---|---|
| 398 | 493 |
|  | Trichloroethylene Extracted, v. D.C. |
| 318 | 385 |
| 334 | 485 |

Figure 2:
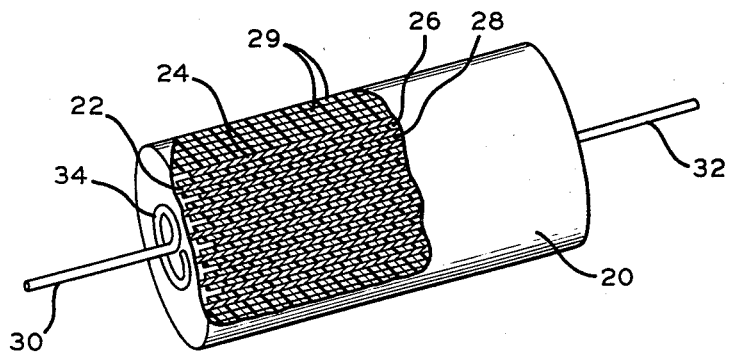
Fig. 2 is a partially cut-away perspective view of a capacitor utilizing the film produced by this invention.

Referring now to Fig. 2 the extracted film of the invention is readily fabricated into the capacitor there pictured in cross-section. The wound condenser section 20 as shown is formed by winding alternate electrode foils 22 and 24 and molecularly oriented polyethylene terephthalate films 26 and 28. By molecular orientation is meant orientation of a planar nature wherein the molecules are oriented in both the width and length of the film. Such orientation is generally accomplished by maintaining the film under latitudinal and longitudinal stress as it is cooled below the transition point. Any of the known methods of winding condenser sections may, of course, be employed with this capacitor, although only the one paper variety of winding is shown, which winding is also done in a non-inductive fashion. For a one-half inch wound one paper capacitor section ¼th mil electrode foils and 1 mil polyethylene terephthalate films would be used, with five outer turns 29 of the resin about the unit so as to act as a resinous outer casing. The lead wires 30 and 32 are shown as extending axially from opposite ends of the capacitor section 20 and the cutaway portion of lead wire 30 is shown to have a loop 34 which makes solder contact with the appropriate electrode foil which extends beyond the polyethylene terephthalate film. The wound section can thereafter be placed between two matched molds which are formed with interior cavities conforming to the desired shape of the finished capacitor. The shoulders of the cavities are preferably of concave shape so as to reduce the size of the end portions of the molded sections, which molding is accomplished by relaxation of the molecular orientation.

The periods of treatment necessary to relax the molecular orientation so as to shrink the polyethylene terephthalate film onto the electrode and the lead wires of course will vary with these specific units being treated. Heating of the units at temperatures between 180° and 200° C. for a thirty-minute period in the mold in a silicon oil bath will produce a molecular orientation necessary to produce the device shown in Fig. 2. Numerous other methods exist for relaxing the molecular oriented film so as to produce the casing as shown in Fig. 2 such as merely heating in an oven from a temperature of 165° C. to 200° C. for periods of approximately 30 minutes, or in other similar types of temperature mediums. It is also to be understood that the capacitor produced with this remarkably improved polyethylene terephthalate film may be encased in the conventional metallic containers, molding resins, paper tubes, and other well-known conventional encasing constructions.

The dissipation factor of polyethylene terephthalate capacitors was lowered by 10 to 15 percent at operational temperatures in excess of 100° C. by use of the extracted film as the dielectric rather than the non-extracted. The improvement of the insulation resistance by 300% to 800% at 125° C. with the modified film is shown by the capacitor electrical characteristics listed in the following table:

*Insulation resistance at 125° C. (megohms × microfarads)*

| Sample | Treatment | Control[1] | Treated | Percent Improvement |
|---|---|---|---|---|
| A | Hot Alcohol | 200 | 1,600 | 800 |
| B | Hot Alcohol | 550 | 1,600 | 300 |
| C | Trichloroethylene | 470 | 1,460 | 330 |

[1] The units tested were of 1 mfd. capacity fabricated of 1 layer of 0.00025 inch thick polyethylene terephthalate convolutely wound with 0.21 mil thick aluminum foil electrode.

The utility of our invention is readily seen from the remarkable improvement of insulation resistance of the extracted polyethylene terephthalate film over the film as received. This will make possible capacitors of excellent storage characteristics of electrical energy within the temperature range of 100° C. to about 200° C. In addition, the electrical characteristics of the polyethylene terephthalate over the temperature range below that of 100° C. is as good or slightly better than the non-extracted polymeric resin.

We have described what we believe to be the best embodiments of our invention, we do not wish, however, to be confined to the embodiments shown, but what we desire to cover by Letters Patent is set forth in the appended claims.

What is claimed is:

1. A process for the improvement of electrical characteristics of polyethylene terephthalate film comprising the steps of treating a film containing a high molecular weight constituent of polyethylene terephthalate and a cyclic trimer of ethylene terephthalate with a solvent for said trimer, extracting the cyclic trimer of ethylene terephthalate from the surface of said film, rinsing said immersed and extracted film in a bath of said solvent having a reduced concentration of trimer of ethylene terephthalate, heating said rinsed film in air and subsequently vacuum drying said film, thus forming a surface of said film substantially free from said cyclic trimer.

2. A process for the improvement of electrical characteristics of polyethylene terephthalate film comprising the steps of immersing in trichloroethylene a film containing a high molecular weight constituent of polyethylene terephthalate having high insulation characteristics and a cyclic trimer of ethylene terephthalate having low resistance, extracting substantial amounts of said cyclic trimer from the surface of said film, rinsing said immersed and extracted film in a bath of trichloroethylene having a reduced concentration of the trimer of the ethylene terephthalate and heating said rinsed film in air at a temperature of from 100 to 150° C. and subsequently vacuum drying said film at a pressure of from 2 to 10 microns to provide a film surface substantially free from the trimer.

References Cited in the file of this patent

UNITED STATES PATENTS

| 2,379,247 | Muskat | June 26, 1945 |
| 2,497,376 | Swallow et al. | Feb. 14, 1950 |
| 2,597,557 | Amborski | May 20, 1952 |

OTHER REFERENCES

"Physical Properties of Polyethylene Terephthalate Films," Industrial and Engineering Chemistry, October 1953, pp. 2290–2295.

UNITED STATES PATENT OFFICE

CERTIFICATE OF CORRECTION

Patent No. 2,923,977                                February 9, 1960

Walter C. Lamphier et al.

It is hereby certified that error appears in the printed specification of the above numbered patent requiring correction and that the said Letters Patent should read as corrected below.

Column 1, line 53, after "These objects have" insert -- been further achieved by the determination of a process --.

Signed and sealed this 16th day of August 1960.

(SEAL)
Attest:

KARL H. AXLINE
Attesting Officer

ROBERT C. WATSON
Commissioner of Patents